United States Patent Office 2,962,451
Patented Nov. 29, 1960

2,962,451

POLYMERIZATION CATALYSTS

Ralph Courtenay Schreyer, Wilmington, Del., assignor to E. I. du Pont de Nemours and Company, Wilmington, Del., a corporation of Delaware No Drawing. Filed Oct. 24, 1955, Ser. No. 542,497

16 Claims. (Cl. 252—429)

This invention relates to novel catalyst systems which are highly valuable for the production of solid ethylene polymers and copolymers. This application is a continuation-in-part of S.N. 455,357 filed September 10, 1954 and S.N. 499,206 filed April 4, 1955, both now abandoned.

Heretofore, it has been widely known that ethylene can be converted to solid polymers under very high pressures in the presence of catalysts which are capable of yielding free radicals under polymerization conditions. It has also been known that heretofore (U.S. Patents 2,212,155, 2,475,520, 2,467,234) certain metal alkyls and Grignard reagents are capable of initiating the conversion of ethylene to solid polymers through a free radical mechanism. Ethylene has also been converted to solid polymers in the presence of hydrogenation catalysts, particularly in the presence of alkali metals or alkali metal hydrides (British Patent 536,102).

Generally speaking, Friedel-Crafts type catalysts have not been effective for converting ethylene to solid polymers, but instead have resulted in the formation of liquid polymers from ethylene; however, it has recently been reported that solid polymers admixed with oils can be obtained by polymerizing ethylene in the presence of aluminum chloride and titanium chloride at elevated temperatures and pressures, and advantageously in the presence of HCl-binding metals like aluminum powder (Fischer, German Patent 874,215 Ausgegeben April 20, 1953).

Redox systems have frequently been disclosed for polymerization of olefinic compounds. In the past, redox systems have resulted in the formation of highly branched low density polymers, except at extremely high superpressures, at which high density ethylene polymers have been obtained heretofore. In many of these systems a heavy metal compound was employed in combination with a reducing component (cf. U.S. Patents 2,380,473 and 2,383,425). While various theories have been advanced as to the mechanism of polymerization in redox systems, the art of polymerizing olefins in the presence of such combinations of catalyst components has not heretofore advanced to the state at which predictions could be made as to which pairs of oxidizable and reducible components might give good results in the conversion of ethylene to solid polymers except, of course, by further experimentation.

It has been discovered in accordance with the present invention that extraordinary and highly useful effects are produced by combining vanadium in a valence state of, at least in part, less than 3 with organic compounds containing ethylenic unsaturation. In specific embodiments, it has been found that vanadium compounds having a valence state of less than 3, which may be combined with radicals (suitable examples being alkoxy radicals and alkyl radicals), can be used effectively in the polymerization of ethylene. Said catalytically active vanadium may be obtained by admixing a vanadium compound with a metallic compound capable of reducing the vanadium. The quantity of reducing agent which is present must be sufficient to convert the vanadium, at least in part, to a valence state of less than 3. In the preferred embodiment of this invention a tetravalent vanadium compound is admixed with a reducing agent to produce a vanadium compound having a valence of less than 3. Coordination of vanadium in its reduced valence state with organic components, etc., does not necessarily destroy its ability as a catalyst; in fact, it appears that ethylene is capable of coordinating in this manner with vanadium in this reduced valence state, and, quite possibly, this phenomenon has a bearing on the mechanism of the polymerization. One group of the catalyst compositions of this invention contains vanadium at an average valence below 3, and it is preferable that at least some of the vanadium in said catalysts is at a valence state of 2, to produce the extraordinary effects herein reported.

It is believed that the coordination complexes hereinabove described are novel compounds which have not been employed heretofore in the polymerization of ethylene or other olefins. The nature of these coordination complexes is not fully understood, but they are active catalysts or catalyst components which are capable of initiating the polymerization of ethylene in an extremely active manner to produce solid ethylene polymers having relatively little side chain substitution. The density of the polymers obtained through the use of these coordination complexes generally exceeds, at least to some extent, the density of polyethylene prepared by the use of free radical types of catalysts except those free radical polymerization processes which employ such extremely high pressures as to produce abnormally high density polyethylene as compared with polyethylene made at moderately high pressure (700 to 1200 atmospheres) by a free radical polymerization process (cf. U.S. Patent 2,586,322).

So active, as ethylene polymerization catalysts, are the coordination complexes hereinabove described that they can be used for polymerizing ethylene to solid polymers at room temperature and atmospheric pressure. These complexes can also be employed in the manufacture of numerous other olefin polymers which heretofore have not been obtainable in a desirable form by any polymerization method whatever.

While the polymerization of ethylene to produce solid polymers in the presence of the catalysts herein disclosed can be carried out under extremely mild conditions as stated in the preceding paragraph, and while the process of this invention may be carried out at subatmospheric or superatmospheric pressures, it is preferable from an economic standpoint to employ moderately high pressures, suitably from 10 to 200 atmospheres or higher, in order to facilitate the handling of ethylene. As indicated above, much higher pressures, up to several thousand atmospheres, can be employed, but it is usually not economically desirable to do this in view of the extraordinary activity of the catalysts at lower pressures. Similarly, extremely low temperatures may be employed. The preferred temperatures are within the range of about 0° C. to 300° C.

The polymerization of ethylene, according to the process of this invention, takes place most satisfactorily when the polymerization mixture is substantially moisture-free and also free of other sources of hydroxyl groups. Since water reacts with the catalyst, the water content of the mixture should be kept at the lowest practicable minimum. As in numerous other ethylene polymerization processes, the polymerization mixture in the process of this invention is preferably kept free of oxygen since oxygen reacts with the catalyst. In practical operations the oxygen content should preferably be held below 20 parts per million. Certain compounds which are capable of coordinating with the vanadium in a reduced valance state form complexes which are too stable for optimum results, and, accordingly, the presence of these compounds should preferably (although not necessarily) be avoided. In this category are ketones and esters. Hydrocarbon solvents, on the other hand, can be used quite effectively as reaction media in which the coordination complexes are soluble.

Among the reducing agents which are most effective for reducing the valence of the vanadium to an average of less than 3, the following may be mentioned:

(1) Organometallic halides such as Grignard reagents and alkyl aluminum halides.
(2) Metal alkyls or aryls and similar organometallic compounds.
(3) Active metals such as sodium, potassium, magnesium, and the like.
(4) Metal hydrides.

The preferred reducing agents are those which contain at least one metal to hydrocarbon bond such as the metal alkyls and organometallic halides.

The vanadium compounds useful in forming the catalyst of the present invention are those which can react with the above-listed reducing agents in an inert hydrocarbon medium. Such vanadium compounds include the general class vanadium salts and alkoxides. Preferred vanadium compounds are vanadium halides and oxyhalides.

The method of this invention is not only useful in the manufacture of ethylene homopolymers but is effective also in the manufacture of such copolymers as ethylene-propylene, ethylene-butadiene, and other ethylene copolymers in which the comonomer is a compound containing an ethylenic bond. Many of these copolymers have properties which differ very widely from copolymers of the prior art, containing the same components.

The invention is illustrated further by means of the following examples:

Example 1

A charge of 1 ml. of vanadium tetrachloride, 10 ml. of tetrabutyl tin, and 100 ml. of cyclohexane was placed into a 325 ml. of stainless steel shaker tube. The tube was pressured with ethylene and heated to 150° C. for 1 hour. The pressure at 150° C. was 1000 p.s.i. The solid product was washed several times with methanol in a Waring Blendor and then dried in a vacuum oven for 5 hours at 50° C. There was recovered 11 grams of colorless polyethylene having a density of 0.96. A pressed film of this material was very tough.

Example 2

A charge of 1 ml. of vanadium tetrachloride, 50 ml. of cyclohexane, 30 ml. of a solution of lithium aluminum tetrabutyl in cyclohexane (approximately 10 grams of lithium aluminum tetrabutyl), and 60 grams of propylene was placed in a 325 ml. shaker tube. The tube was heated to 80° C. for 2 hours under autogenous pressure. After washing the product several times with methanol in a Waring Blendor, followed by drying in a vacuum oven at 50° C. for 5 hours, there was recovered 10.5 grams of limp, rubbery polypropylene.

Example 3

There was charged into a shaker tube 0.001 mole of vanadium tetrachloride, 0.02 mole of tetrabutyl tin, and 100 ml. of toluene. The tube was pressured with ethylene and heated for ½ hour at 100° C., and a pressure of 1000 p.s.i., followed by an additional ½ hour at 200° C., and 1100 p.s.i. pressure. The product was filtered, washed in a Waring Blendor with hydrochloric acid-acetone mixture, and dried. There was recovered 15 grams of polyethylene having a density of 0.95 and a melt index (ASTM-D-1238-52-T) of 0.02 at 190° C. A very tough film was formed by pressing a portion of this polymer at 190° C.

Example 4

Into a 325 ml. shaker tube there was charged 4 grams of vanadium tetrachloride, 25 ml. of a three molar solution of phenyl magnesium bromide in ethyl ether, and 125 ml. of benzene. The tube was pressured with 1000 p.s.i. of ethylene and was shaken for 2 hours at 98° C. to 150° C. After filtering washing, and drying the product, there was obtained 13 grams of polyethylene exhibiting a density of about 0.99.

Example 5

Into a 325 ml. shaker tube there was charged 3.8 grams of vanadium tetrachloride, 2 grams of magnesium metal, and 100 cc. of benzene. The tube was pressured with 1100 p.s.i. of ethylene and was shaken for 4 hours at 176° C. to 180° C. There was recovered 8 grams of dry polyethylene having essentially the same properties as those described in Example 1.

Example 6

Into a 325 ml. shaker tube there was charged 7 grams of vanadium tetrachloride, 2 grams of magnesium metal and 100 cc. of benzene. The tube was pressured with 1000 p.s.i. of ethylene and was shaken for 3 hours at 166° C. to 170° C. The reaction product was filtered and washed several times with methanol and dried in a vacuum oven at 50° C. There was recovered 6.5 grams of polyethylene exhibiting a melt index of 0.123 at 190° C. and a density of 0.9609.

Example 7

Into a pressure reaction vessel having a capacity of 330 ml. was charged under a blanket of nitrogen 200 ml. of dry cyclohexane containing 1 ml. of vanadium oxytrichloride. To this solution was added 2 ml. of diethyl aluminum bromide. The reaction vessel was flushed with ethylene, heated to 75° C. and pressured to 1000 p.s.i. with ethylene. At the start of the reaction the temperature rose to 144° C. and the pressure decreased to 300 p.s.i. The reaction vessel was repressured to maintain a pressure of 500 to 1000 p.s.i. After one hour the reaction mixture was cooled to room temperature, and excess monomer vented off. The resulting reaction mixture was filtered and the polymer retained was washed and dried. 26.3 grams of a white solid polymer having a density of 0.95 was obtained upon drying. The polymer could be molded into tough, flexible films by pressing at 200° C. under 20,000 p.s.i. pressure for a period of two minutes.

Example 8

Into a glass reaction vessel equipped with a reflux condenser, a stirrer and gas inlet and outlet means was charged under a blanket of nitrogen 400 ml. of dry cyclohexane containing 1 ml. of vanadium tetrachloride. To this solution was added 2 ml. of a mixture of diethyl and monoethyl aluminum bromide having an approximate weight ratio of 7 to 3. The nitrogen was then replaced by ethylene at atmospheric pressure. Upon agitation of the reaction mixture, ethylene was adsorbed into the system at the rate of 1.5 to 3 liters per minute. The exothermic nature of the reaction caused the temperature to increase from room temperature to 70° C. The temperature of the reaction mixture was controlled at 65° C. by applying cooling water to the reaction vessel. The reaction was stopped after twenty minutes when a thick slurry of polymer had formed in the reaction vessel. Upon filtration, washing and drying 43.2 grams of a white polymer was obtained, which was found to have a density of 0.955. The polymer could be molded into tough flexible films by pressing at 200° C. under 20,000 p.s.i for a period of two minutes.

Example 9

Into a pressure reaction vessel having a capacity of 330 ml. was charged under a blanket of nitrogen 200 ml. of dry cyclohexane containing 1 ml. of vanadium tetrachloride. To this solution was added 2 ml. of diethyl aluminum bromide. The reaction vessel was flushed with propylene, heated to 66° C. and pressured to 600 p.s.i with propylene. Upon agitation, an exothermic reaction set in increasing the temperature to 102° C. A pressure of 400 to 600 p.s.i. was maintained throughout the course of the reaction. After one hour the reaction mixture was cooled to room temperature and excess propylene monomer was vented off. The reaction mixture was filtered and the polymer retained by the filtration was washed and dried. Twenty grams of a white rubbery solid was obtained. The propylene polymer was found to have a melt index value of 17.4 as determined by the ASTM-1238-52-T test method. The density of the polymer was 0.880.

Example 10

Into a glass reaction vessel equipped with a reflux condenser, a stirrer and gas inlet and outlet means was charged under a blanket of nitrogen 400 ml. of dry cyclohexane containing 1 ml. of vanadium oxytrichloride. To this solution was added 2 ml. of diethyl aluminum bromide. The nitrogen was then replaced by propylene at atmospheric pressure. Upon agitation of the reaction mixture, propylene was adsorbed at the rate of 0.5 liter per minute. The exothermic nature of the reaction caused the temperature to increase from room temperature to 40° C. The reaction was stopped after one hour. Upon filtration of the reaction mixture a tacky polymer of propylene was obtained, which on washing and drying weighed 14 grams. The polymer was found to have a density of 0.876.

Example 11

Into a pressure reaction vessel having a capacity of 1 liter was charged under a blanket of nitrogen 200 ml. of dry cyclohexane containing 4.5 millimoles of isopropyl vanadate $VO[O-CH(CH_3)_2]_3$. To this solution was added 15.6 millimoles diethyl aluminum bromide. The reaction vessel was flushed with ethylene, heated to 65° C. and pressured to 1000 p.s.i. with ethylene. At the start of the reaction the temperature rose to 173° C. and the pressure decreased to 225 p.s.i. The reaction vessel was repressured to maintain a pressure of 500 to 1000 p.s.i. After one hour, the reaction mixture was cooled to room temperature and excess monomer vented off. The resulting mixture was filtered and the polymer retained was washed and dried. The resulting white solid polymer weighed 42 grams and was found to have a density of 0.952. The polymer could be molded into tough, flexible films by pressing at 200° C. under 20,000 p.s.i. pressure for a period of two minutes.

Example 12

The relative activity of vanadium catalysts as affected by various reducing agents was measured by an atmospheric polymerization of ethylene. Into a glass reaction vessel, equipped with reflux condenser, stirrer and gas inlet and outlet means, was charged 100 ml. of dry cyclohexane. The reaction system was then filled with ethylene at atmospheric pressure. After the cyclohexane had been saturated with ethylene and equilibrium reached, a given amount of reducing agent, listed below, dissolved in a few ml. of cyclohexane was added. The reaction mixture was stirred and 1 micromole of vanadium tetrachloride dissolved in a few ml. of cyclohexane was added. The rate of polymerization resulting from the addition of the vanadium tetrachloride was measured by the uptake of ethylene in the system which was kept at atmospheric pressure. The following results were obtained:

| Reducing Agent | Quantity of Reducing Agent, micromoles | Volume of ethylene polymerized in 80 min., milliliters |
| --- | --- | --- |
| Ethyl aluminum dibromide | 135 | 520 |
| Diethyl aluminum chloride | 67 | 440 |
| Diethyl aluminum bromide | 67 | 430 |
| Triethyl aluminum | 45 | 100 |

It is to be observed that the foregoing examples are illustrative only, and that numerous embodiments of the invention will occur to those who are skilled in the art.

As hereinabove indicated, the quantity of the reducing component of the polymerization mixture can be varied rather widely, but it is essential that the reducing component be a sufficiently strong reducing agent and also that it be employed in sufficient quantity to reduce the valence of the vanadium, at least in part, to less than 3. It appears that it is most desirable to have at least part of the vanadium at a valence of 2. It is, therefore, preferred to have at least equimolar quantities of the vanadium compound and the reducing agent present.

The products obtained by polymerizing ethylene with catalysts hereinabove disclosed normally are solid polymers, although the process of this invention is sufficiently versatile to produce lower molecular weight products in the form of greases or oils if so desired.

The activity of the catalyst depends in part upon the nature of the groups which are attached to the vanadium atom. It is quite possible that this effect depends upon the amount of shielding around the vanadium, i.e., the shielding power of the group attached to vanadium influences the activity of the catalyst by influencing the tendency of the vanadium to coordinate. Electrical effects may also play a part in this. On the other hand, large organic groups may be attached to the vanadium with beneficial results when such groups impart solubility to the catalyst.

The quantity of catalyst employed can be varied over a rather wide range. It is desirable to employ a quantity of catalyst which is at least large enough to produce a reasonably rapid rate for a reasonably long period of time. Suitably, the preferred quantity is within the range of 0.001% to 10% based on the weight of vanadium per unit weight of monomer.

The polymers which are made under the conditions hereinabove described frequently have such tremendously high molecular weights that removal of catalyst by dissolving and filtering is extremely difficult. The best procedure for obtaining the polymer in a clean form is to wash with acetone-hydrochloric acid mixture in a Waring Blendor several times followed by washing with acetone and thereafter, if necessary, followed by several acetone-aqueous sodium hydroxide washes and finally by acetone-water wash. Finally, the polymer can be washed with acetone. The products thus obtained are generally snow-white. While this procedure is highly satisfactory for preparing clean polymer, it is to be understood that simpler procedures, such as treatment with water at elevated temperatures, will be entirely suitable for various practical applications. For other applications, it is not essential to remove traces of catalyst.

The structure of the polyethylene made in accordance with the process of this invention evidently is characterized by being a straight chain hydrocarbon, with vinyl groups at one or both ends of at least some of the molecules. The infrared measurements indicate very little methyl substitution and a very small number of vinylidene groups with little or no transunsaturation or carbonyl groups.

The ethylene polymers obtained in accordance with the process of this invention are highly valuable in numerous applications especially in the form of films, fibers, rods, tubes, molded articles, extruded insulation on wire, etc. In those embodiments in which the catalyst is not removed from the polymeric product or is only incompletely removed, the products are thermally stable, somewhat surprisingly. When the polymerization is carried out in a system in which the catalyst is dissolved in the inert medium, the polymer precipitates from the polymerization mixture in a form which may contain measurable amounts of vanadium, e.g. as much as 0.5%. Such compositions are highly useful despite their content of vanadium.

The exact constitution of these catalysts is not necessarily understood in complete detail. It is recognized, however, that vanadium in a reduced valence state is capable of forming complexes as above described. It is also recognized that alkyl and aryl, or other hydrocarbon groups, can, by metathetical reactions, become attached to the vanadium atom by primary valence bonds in either the divalent, trivalent, or tetravalent state. Alternatively, such hydrocarbon groups can be initially attached to the vanadium, prior to the reduction.

I claim:

1. A polymerization catalyst suitable for use in the polymerization of ethylenically unsaturated hydrocarbon monomers, which comprises the product formed by admixing a vanadium compound of the class consisting of vanadium halides, oxyhalides and alkoxides, said vanadium being at a valence state of three and above, with a compound having at least one metal to hydrocarbon bond of the class consisting of alkyl aluminum halides and metal alkyls, wherein the metal is of the class consisting of aluminum, tin and lithium aluminum, said compound being admixed in sufficient quantity to reduce the vanadium compound to at least in part below 3.

2. The polymerization catalyst of claim 1 wherein the vanadium compound is vanadium tetrachloride.

3. The polymerization catalyst of claim 1 wherein the vanadium compound is vanadium trichloride.

4. The polymerization catalyst of claim 1 wherein the vanadium compound is vanadium oxytrichloride.

5. The polymerization catalyst of claim 1 wherein the vanadium compound is triisopropyl vanadate.

6. The polymerization catalyst of claim 1 wherein the compound having at least one metal to hydrocarbon bond is a lithium aluminum alkyl.

7. The polymerization catalyst of claim 1 wherein the compound having at least one metal to hydrocarbon bond is a dialkyl aluminum halide.

8. The polymerization catalyst of claim 1 wherein the compound having at least one metal to hydrocarbon bond is an alkyl aluminum dihalide.

9. A polymerization catalyst suitable for use in the polymerization of ethylenically unsaturated hydrocarbon monomers, which comprises the reaction product formed by admixing a vanadium halide at a valence state of three and above with a metal alkyl wherein the metal is of the class consisting of aluminum, tin and lithium aluminum, in the presence of an inert liquid hydrocarbon medium, said organometallic compound being employed in sufficient quantity to reduce the valence of the vanadium to less than 3.

10. The polymerization catalyst of claim 9 wherein the metal alkyl is a tin tetraalkyl.

11. The polymerization catalyst of claim 9 wherein the metal alkyl is a lithium aluminum tetraalkyl.

12. The polymerization catalyst of claim 10 wherein the tin tetraalkyl is tin tetrabutyl.

13. The polymerization catalyst of claim 11 wherein the lithium aluminum tetraalkyl is lithium aluminum tetrabutyl.

14. A polymerization catalyst suitable for use in the polymerization of ethylenically unsaturated hydrocarbon monomers which comprises the reaction product formed by admixing a vanadium halide selected from the class consisting of vanadium tetrachloride and vanadium oxytrichloride, with a metal alkyl selected from the class consisting of tin tetraalkyl and lithium aluminum tetraalkyl, in the presence of an inert liquid hydrocarbon medium, said metal alkyl being employed in sufficient quantity to reduce the valence of the vanadium to less than 3.

15. The polymerization catalyst of claim 14 wherein the metal alkyl is tin tetrabutyl.

16. The product of claim 14 wherein the metal alkyl is lithium aluminum tetrabutyl.

References Cited in the file of this patent

UNITED STATES PATENTS

| | | |
|---|---|---|
| 2,460,700 | Lyons | Feb. 1, 1949 |
| 2,688,603 | Baldwin | Sept. 7, 1954 |
| 2,721,189 | Anderson et al. | Oct. 18, 1955 |

FOREIGN PATENTS

| | | |
|---|---|---|
| 533,362 | Belgium | May 16, 1955 |

OTHER REFERENCES

Gilman, "Organic Chemistry," Wiley and Sons, N.Y., 1943, vol. 1, page 561.

"J. Organic Chemistry," vol. 10 of 1945, pages 505–515.

Disclaimer 2,962,451.—*Ralph Courtenay Schreyer*, Wilmington, Del. POLYMERIZATION CATALYSTS. Patent dated Nov. 29, 1960. Disclaimer filed May 19, 1966, by the inventor; the assignee, *E. I. du Pont de Nemours and Company*, concurring.

Hereby enters this disclaimer to claims 1, 8 and 9 of said patent.

[*Official Gazette October 25, 1966.*]